US006922492B2

(12) United States Patent
Yu et al.

(10) Patent No.: US 6,922,492 B2
(45) Date of Patent: Jul. 26, 2005

(54) VIDEO DEBLOCKING METHOD AND APPARATUS

(75) Inventors: Zhenghua Yu, North Epping (AU); Jian Zhang, Enfield (AU)

(73) Assignee: Motorola, Inc., Schaumburg, IL (US)

( * ) Notice: Subject to any disclaimer, the term of this patent is extended or adjusted under 35 U.S.C. 154(b) by 152 days.

(21) Appl. No.: 10/330,388

(22) Filed: Dec. 27, 2002

(65) Prior Publication Data

US 2004/0126034 A1 Jul. 1, 2004

(51) Int. Cl.[7] .................................................. G06K 9/40
(52) U.S. Cl. ....................................... 382/260; 382/275
(58) Field of Search ................................. 382/166, 254, 382/261, 266, 268, 275, 251, 248, 232–233, 260–269; 375/240.24–240.25, 240.03, 240.02, 240.2, 240.01, 240.11, 240.12, 240.29, 240.27; 358/426.14; 341/94

(56) References Cited

U.S. PATENT DOCUMENTS

| | | | | |
|---|---|---|---|---|
| 4,941,043 A | * | 7/1990 | Jass | 375/240.2 |
| 5,654,759 A | * | 8/1997 | Augenbraun et al. | 375/240.03 |
| 5,850,294 A | * | 12/1998 | Apostolopoulos et al. | 358/426.14 |
| 6,160,503 A | * | 12/2000 | Andrews et al. | 341/94 |
| 6,188,799 B1 | * | 2/2001 | Tan et al. | 382/260 |
| 6,236,764 B1 | * | 5/2001 | Zhou | 382/266 |
| 6,516,030 B1 | * | 2/2003 | Lynch et al. | 375/240.11 |
| 6,539,060 B1 | * | 3/2003 | Lee et al. | 375/240.29 |
| 6,633,683 B1 | * | 10/2003 | Dinh et al. | 382/260 |
| 6,636,645 B1 | * | 10/2003 | Yu et al. | 382/268 |
| 6,724,944 B1 | * | 4/2004 | Kalevo et al. | 382/268 |
| 6,728,414 B1 | * | 4/2004 | Chang et al. | 382/254 |
| 2003/0206587 A1 | * | 11/2003 | Gomila | 375/240.12 |

OTHER PUBLICATIONS

Schclar et al., Deblocking of block DCT compressed images using deblocking frames of variable size, IEEE ISSN: 1520–6149, 3285–3288.*
Kuo et al., Enhancing image codes by spatial noise shaping, IEEE 1068–0314/01, 321330.*
Sampon et al., A method of enhancing the picture quality of low bit–rate block–coded images, IEEE inspec No. 5044799, 40–44.*

* cited by examiner

Primary Examiner—Leo Boudreau
Assistant Examiner—Ishrat Sherali

(57) ABSTRACT

Digital video imagery is deblocked as a function of horizontal and/or vertically oriented pixels that share a common attribute (such as a corresponding pixel value). In particular, a deblocking filter can be selected from amongst a plurality of candidate deblocking filters as a function of the presence of pixels that are both adjacent to one another and that are substantially similar to one another. The selected deblocking filter can be applied as a function, at least in part, of a respective center of the pixels that are both adjacent and similar to one another. In one embodiment, luminance information is deblocked pursuant to a process that is different from a deblocking process that is used with chrominance information.

24 Claims, 3 Drawing Sheets

VIDEO DEBLOCKING METHOD AND APPARATUS

TECHNICAL FIELD

This invention relates generally to video deblocking.

BACKGROUND

Digitally represented video information comprises a relatively well-understood area of endeavor (for both still images and moving images). Unfortunately, fully Nyquist-compliant encoding of such information typically results in a quantity of data that often unduly challenges storage and/or transmission bandwidth availability in various settings. As a result, a number of coding methods and standards have been suggested to provide a reduced quantity of required encoding data. Many such video coding standards, including but not limited to H.263 and MPEG-4, are premised upon a block based hybrid differential pulse code modulation/motion compensation/discrete cosine transform coding algorithm.

Unfortunately, due to the lossy nature of such a coding approach (particularly at low bit rates) and the block based coding architecture, such an algorithm will typically produce blocking artifacts that are readily visible in the resultant decoded video image or sequence. Such blocking artifacts tend not only to be obvious but unnatural and annoying to many viewers.

Prior art solutions, to date, have tended to either require higher bit rates (and hence a greater quantity of data) and/or considerably increased architectural or computational complexity to provide acceptable-to-mildly-inferior visual content or relatively low complexity solutions that yield relatively inferior visual quality. When the latter becomes exemplified through additional hardware and/or considerably increased computational capacity, the required cost of the decoding platform tends to increase beyond a commercially acceptable price point. At the same time, many such solutions tend, never the less, to still produce an unacceptable level of blocking artifacts in the resultant video.

BRIEF DESCRIPTION OF THE DRAWINGS

The above needs are at least partially met through provision of the video deblocking method and apparatus described in the following detailed description, particularly when studied in conjunction with the drawings, wherein.

Figure 1:
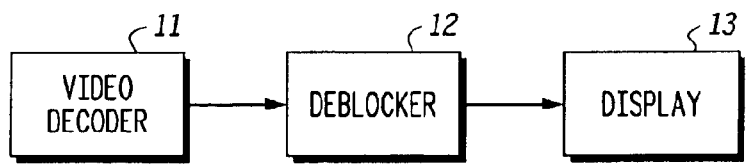
FIG. 1 comprises a block diagram as configured in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, pixels comprising decoded video information are processed to identify those pixels having a predetermined spatial relationship with respect to one another and further that share a common attribute. In a preferred embodiment, the pixels are processed to identify those pixels that are adjacent to one another (both horizontal and vertical adjacency is considered in a preferred approach) and that share substantially similar content. In one preferred embodiment, adjacent pixels that are identical to one another are specifically sought and identified. A deblocking filter is then selected (from amongst a plurality of candidate deblocking filters) based, at least in part, upon the identified pixels that share the common attribute. In a preferred embodiment, the selected deblocking filter is then applied as a function of a respective center of the pixels that share the common attribute.

In one embodiment, the plurality of deblocking filters include at least a strong filter that will affect a majority of pixels within the selected pixels and a weak filter that will affect only a minority of the pixels as are contained within this same group of selected pixels. Four or five appropriately selected deblocking filters can yield satisfactory results for many purposes. When applying the selected deblocking filter as a function of the respective center of the pixels that share the common attribute, the filtering may, in a preferred embodiment, be selectively bilaterally symmetrical with respect to that respective center or bilaterally non-symmetrical with respect to that respective center. This selective flexibility provides considerable capability to product resultant video without many of the blocking artifacts that would otherwise likely be introduced through more traditional processing.

Decoded video information often comprises luminance information and at least two channels of chrominance information. Pursuant to a preferred embodiment, the deblocking process that is applied with respect to the luminance information differs from the deblocking process that is applied with respect to the chrominance information channels. In particular, smaller-sized pixel blocks can be utilized with chrominance information and a smaller set of candidate deblocking filters can be utilized. By permitting such differential treatment, improved deblocking results can be expected with concurrent reduced overall complexity rather than increased complexity.

Referring now to the drawings, and in particular to FIG. 1, a video display platform 10 includes generally a video decoder 11, a deblocker 12, and a display 13. The video decoder 11 comprises a digital video decoder and can be realized with any of a wide variety of such decoders, including decoders that are compatible with H.263, MPEG-4, and so forth. In general, the teachings set forth herein are suitable for compatible use with most or all block based coding methodologies. The output of the video decoder 11 will ordinarily comprise one or more digital streams that represent the pixels that correspond to the luminance and chrominance video information. The display 13 can be any suitable currently known or later developed video display mechanism including but not limited to a cathode ray tube, a liquid crystal display, and a plasma display.

Figure 2:
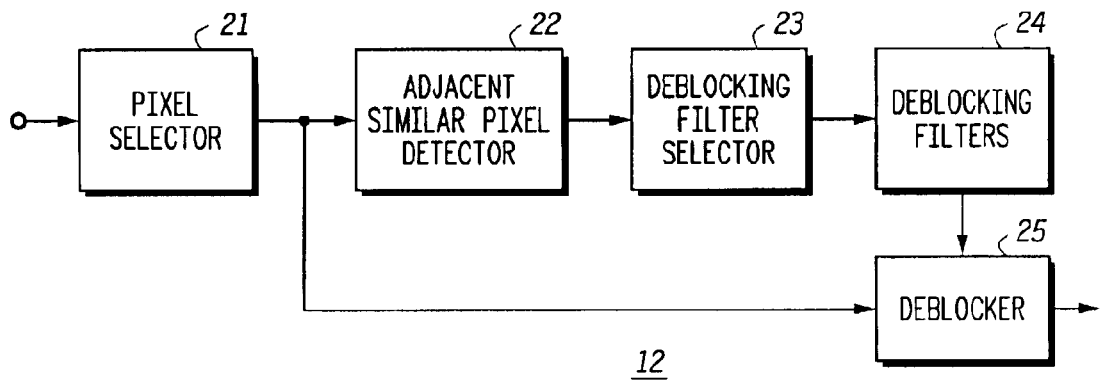
FIG. 2 comprises a block diagram as configured in accordance with an embodiment of the invention.

The deblocker 12 serves to process the pixel information from the video decoder 11 and provide a deblocked version of that information to the display 13 for visual rendering. Referring now to FIG. 2, the deblocker 12 generally includes a pixel selector 21, an adjacent similar pixel detector 22, a deblocking filter selector 23, a plurality of deblocking filters 24, and a deblocker 25. The pixel selector 21 selects groups of pixels to be processed. In a preferred embodiment, the pixel selector 21 selects groups comprising horizontally or vertically contiguous pixels. For example, the pixel selector 21 can select groups comprising a predetermined number of contiguous pixels that are aligned in a row or column (using the placement of the pixels in a reconstructed image as the frame of reference).

These selected pixels are then processed by the adjacent similar pixel detector 22 to identify adjacent pixels that share a common attribute. In a preferred embodiment, this detector 22 identifies adjacent pixels that have an identical value (wherein the value typically corresponds to, for example, a particular color and/or intensity or brightness). Based upon this information (i.e., those pixels that have identical adjacent pixels as well as their relative location within the group of pixels being processed), the deblocking filter selector 23 determines a particular filtering mode by, in a preferred embodiment, selecting a particular deblocking filter from amongst a plurality of deblocking filters. The deblocker 25 then utilizes the selected deblocking filter 24 and adaptively applies it to the corresponding group of pixels.

In a preferred embodiment, the deblocking filters 24 include at least four or five deblocking filters. These filters can differ from one another in various ways. In a preferred approach, some of the filters are stronger than others (in general, the stronger the filter, the greater the number of pixels within the group of pixels that will be affected). Additional detail regarding such deblocking filters and their use and application appears below.

Figure 3:
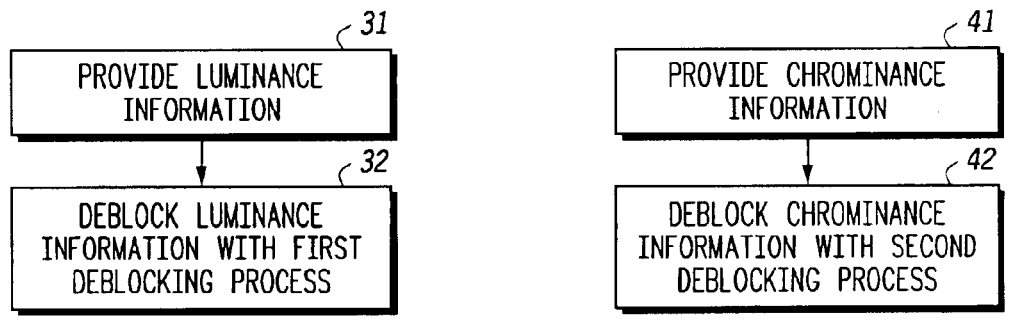
FIG. 3 comprises a flow diagram as configured in accordance with an embodiment of the invention.
Figure 4:
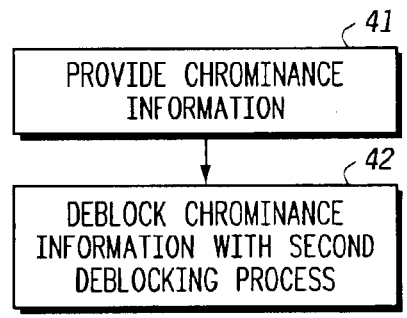
FIG. 4 comprises a flow diagram as configured in accordance with an embodiment of the invention.

Referring momentarily to FIGS. 3 and 4, as noted earlier, the video decoder 11 provides both luminance information 31 and chrominance information 41. As illustrated below in more detail, the deblocker 12 deblocks 32 the luminance information using a first deblocking process and deblocks 42 the chrominance information using a second deblocking process, which second deblocking process is different than the first deblocking process. Exemplary processes are also presented below. It will be appreciated here, however, that such bifurcation permits greater flexibility with respect to processing needs and thereby aids in permitting the provision of improved video results without necessarily unduly increasing corresponding platform or processing complexity.

The platforms described above can be implemented in a variety of ways. For example, discrete circuitry and/or logic modules can be utilized to effect the described activities. As another example, part or all of these functions can be largely or completely attended through use of a programmable platform such as a microprocessor or a group or network of programmable platforms. These teachings should therefore not be viewed as being limited to a particular physical configuration.

Figure 5:
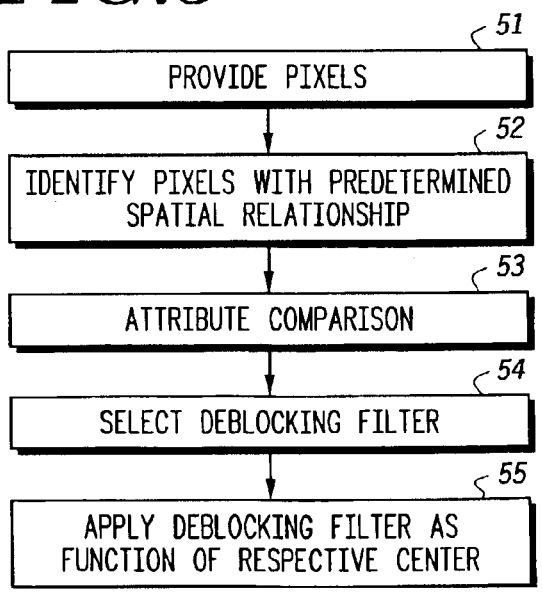
FIG. 5 comprises a flow diagram as configured in accordance with an embodiment of the invention.

Referring now to FIG. 5, it can be seen that a preferred deblocking approach includes providing pixels 51 from a video decoder and identifying pixels 52 that have a predetermined spatial relationship. As already noted, this can be effected by identifying pixels that are vertically or horizontally adjacent to one another. (In a preferred approach, the video information pixels are processed with respect to both a vertical orientation and a horizontal orientation, either in parallel or serially, to permit improved deblocking performance as compared to processing with only one orientation or the other.) In particular, and in a preferred embodiment, the process particularly compares 53 pixels that are adjacent to one another with respect to at least one predetermined attribute. In a preferred embodiment, the adjacent pixels are compared to identify pixels that are at least substantially similar to one another and, preferably, identical to one another.

Figure 6:
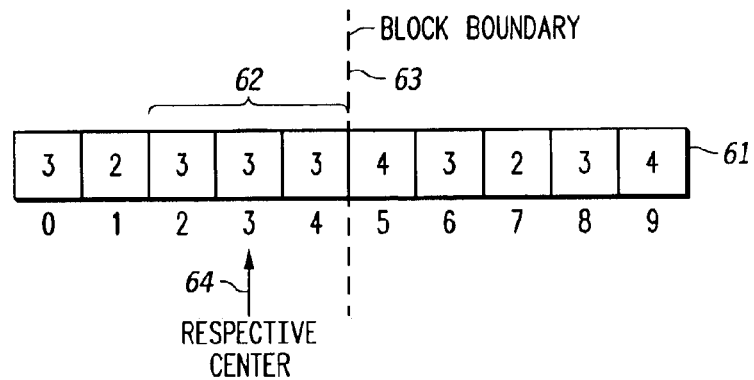
FIG. 6 comprises a schematic view of a horizontal row of selected pixels as configured in accordance with an embodiment of the invention.

The degree of similarity can be varied as desired or appropriate to suit a given application. For example, when each pixel can only assume one of 25 values, equal values may be most appropriate. As another example, when each pixel can assume any of 500 values, a range (such as plus or minus 15) to test for substantial similarity may be more appropriate. As a simple example, and referring momentarily to FIG. 6, a series of ten horizontally oriented pixels 61 each have a value of from 1 to 5. In this example, the first pixel 0 has a value of 3, the second pixel 1 has a value of 2, and so forth. As illustrated, the third, fourth, and fifth pixels 2, 3, and 4 each have a value of 3. These pixels, being both adjacent to one another and having an identical value, could accordingly be identified pursuant to the process described. In a preferred embodiment, the process will also determine how many groups of identical (or substantially identical) adjacent pixels exist in the group being processed, along with determining the relative number of pixels in each such group. For example, in the illustrative example of FIG. 6, only a single group 62 of pixels exist that share a common attribute, with that single group 62 being comprised of three member pixels.

Referring again to FIG. 5, the process then selects 54 a deblocking filter based upon the previously developed information regarding the pixels. The selected deblocking filter is then applied 55 as a function of the respective center of the selected group of pixels that share the common attribute. For example, and referring again to FIG. 6, although the ten pixels that comprise the overall group of pixels 61 are equally distributed on either side of the original block boundary 63 for the pixel information, and although many a typical prior art approach would prompt application of a deblocking process in a symmetrical fashion with respect to that block boundary 63, the preferred process instead applies the selected deblocking filter as a function of a respective center 64 of the selected group of pixels 62. This does not necessarily mean, however, that only the pixels of the selected group of pixels 62 are affected by the selected deblocking filter. Instead, the pixels affected can be less than the total number of pixels in the selected group 62, or all of these pixels, or all or some of these pixels in addition to pixels that are not a part of the selected group 62. Pursuant to these teachings, a plurality of deblocking filters are made available, wherein the deblocking filters differ from one another at least with respect to the number of pixels in the overall group 61 that are affected by the filtering activity. As already noted, the greater the number of pixels that are so affected, the stronger one may characterize the filter.

It should also be noted that, in a preferred embodiment, at least some of the plurality of deblocking filters can also be differentiated with respect to whether the filtering activity is applied bilaterally symmetrical or non-bilaterally symmetrical with respect to the respective center 64 of the group of selected pixels 62.

In combination, this use of a respective center, the provision of deblocking filters of varying strength, and flexibility with respect to bilateral or non-bilateral symmetry permits great agility and capability with respect to achieving a smooth and visually pleasing deblocked video result.

As noted above, a full implementation will usually work with video images that are comprised of two-dimensional representations. Therefore, in a preferred approach, both horizontal deblocking and vertical deblocking are beneficial. In a preferred approach, the same algorithm can be applied to both orientations (if desired, of course, and/or as appropriate to a given application, differing algorithms can be applied instead of using a common algorithm). In a preferred embodiment, the deblocking filters will be selected for both orientations prior to applying either (that is, the deblocking filters are preferably selected as based upon raw, non-deblocked pixels). Therefore temporary storage of filter selection information may be required and is easily provided through use of appropriate corresponding memory (not shown).

To illustrate this approach in more detail, for one color channel, the deblocking algorithm preferably has the following four stages:

1. Horizontal Deblocking Filter Decision. The pixels are read column by column, with a horizontal deblocking filter selection map being generated to preferably include each pixel. This stage will preferably not change the value of any pixels as stored, for example, in an input buffer (not shown).
2. Vertical Deblocking Filter Decision. The pixels are read line by line, with a vertical deblocking filter selection map being generated to preferably include each pixel. This stage will preferably again not yet change the value of any pixels. (If desired, the vertical deblocking filter decision can be made prior to, or concurrent with, the horizontal deblocking filter decision, depending upon system capacity and the needs of a given situation.)
3. Vertical Deblocking. The pixels are read line by line with deblocking filtering being applied in accord with the vertical deblocking filter selection map. The resultant partially deblocked data is then stored (either in a new memory location or, for example, back in the input buffer as referenced earlier).
4. Horizontal Deblocking. The pixels are read column by column with deblocking filtering being applied in accord with the horizontal deblocking filter selection map. After deblocking the resultant fully deblocked data can then be stored and/or provided elsewhere as appropriate to the application.

For luminance information, the deblocking algorithm preferably works on an 8 by 8 block basis, such that eight pixels in a row will have the same horizontal deblocking filtering selection and eight pixels in a column will have the same vertical deblocking filtering selection. For the two channels of chrominance information a different deblocking process applies as noted earlier. In particular, in a preferred approach, the deblocking process works on a 4 by 4 block basis, such that every four pixels (rather than eight pixels) in a column or a row will have the same deblocking filtering selection.

The deblocking process for luminance and chrominance pixels can also vary with respect to the number (and/or kind) of candidate deblocking filers that are provided. In a preferred approach, for luminance data there are five possible filters, ranging from strongest (where eight pixels are filtered using bilateral symmetry about the respective center), strong (where six pixels are filtered using bilateral symmetry about the respective center), top/left blocky (where five pixels are filtered using non-bilateral symmetry about the respective center), bottom/right blocky (where five pixels are filtered using non-bilateral symmetry about the respective center), to weak (where, for example, only two to four pixels are filtered, typically using bilateral symmetry about the respective center). Conversely, in a preferred embodiment, for chrominance information, the deblocking process provides only one deblocking filter selection which in turn will filter four pixels.

An illustrative example for luminance information will now be provided. For purposes of this illustration, and referring now to FIG. 7, v0 through v9 represent ten pixels in a row or a column. In either case, the position between pixels v4 and v5 comprises the original block boundary 71 as defined during the original video coding process. The values of every two adjacent neighboring pixels are examined to determine whether they are substantially similar (e.g. v0–v1, v1–v2, and so forth). Once such pairs are identified, the process then calculates the number of consecutive substantially similar pixels. If the number is greater than a threshold value (such as, in a preferred embodiment, the threshold value 3) then blocking artifacts are detected. Blocking artifacts tend to happen at both ends of the group of pixels that share the substantially similar value. To illustrate, if pixels v3–v7 all have an equal value, blocking artifacts may be evident around pixels v3 and v7.

In this example there are six possible scenarios to consider. In a first scenario there are two such pixel groups in a given row/column, with at least one of the two pixels that comprise the ends of the ten pixels (these being pixels v0 and v9 in this example) not being part of the two pixels groups. For example, pixel v0 may be of value "A," pixels v1–v4 may be of value "B," and pixels v5–v9 may be of value "C". In such a case the strongest available deblocking filtering will preferably be applied at the boundary of v4 and v5.

In a second scenario, there are two such pixel groups in a given row/column, with both of the end pixels (these being pixels v0 and v9) being part of the two pixels groups. For example, pixels v0–v4 may be of value "A" and pixels v5–v9 may be of value "B." In such a case relatively strong (though not necessarily the strongest available) deblocking filtering will preferably be applied at the boundary of v4 and v5.

In a third scenario, there is only one such pixel group in a given row/column, and neither of the two end pixels (these being pixels v0 and v9) being part of this one pixel group. For example, pixel v0 may be of value "A," pixels v1–v8 may be of value "B," and pixel v9 may be of value "C." In this case the strongest deblocking filtering will again preferably be applied at the boundary of v4 and v5.

In a fourth scenario, the left side of the overall group of pixels contains one or more groups of substantially equal pixels. For example, pixels v0–v4 may be of value "A," pixel v5 may be "B," pixel v6 may be "C," and pixel v7 may be "D." In this case the left side can be characterized as blocky and a medium strength deblocking filter may be applied at the boundary of pixels v4 and v5.

In a fifth scenario, the right side can include several adjacent substantially similar pixels. For example, pixel v2 may be "A," pixel v3 may be "B," pixel v4 may be "C," and pixels v5 through v9 may all be "D." In this case the right side can be characterized as blocky and a medium strength deblocking filter can be applied at the boundary of pixels v4 and v5.

In a final scenario, neither side of the block boundary 71 contains adjacent substantially similar pixels. In such a case, a weak deblocking filter may be applied at the boundary of pixels v4 and v5 (the latter being the location of the original block boundary 71).

The deblocking process for luminance information therefore can be seen to detect pixels of the same (or substantially similar, if desired) value first, and depending on the scenario as discussed above, to then select a deblocking filter and apply the selected filter. For chrominance information channels a relatively simplified deblocking algorithm can be applied. Simplification can achieve nevertheless acceptable deblocking results at least in part because blocking artifacts in chrominance information themselves tend not to be as dominant and influential (and hence not as subjectively objectionable) with respect to the resultant visual image.

Figure 7:
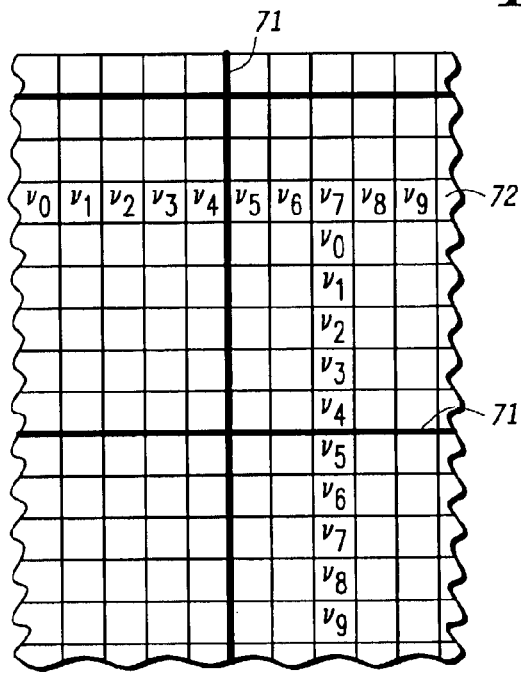
FIG. 7 comprises a graph as configured in accordance with an embodiment of the invention.

As illustrated in FIG. 7, in a preferred embodiment, the process selects ten pixels in a line or a row around an original horizontal or vertical block boundary 71. It then selects a particular deblocking filter (out of four or five possible candidate filters as appropriate to a given application and/or as desired) for pixels in such row or column. For purposes of further illustrative elaboration, presume now that pixels v0–v9 as denoted by reference numeral 71 denote a group of ten selected pixels. Firstly all the neighboring pairs are compared to see whether they are substantially similar (or, as simply illustrated here, equal). Using register notation, this process can be represented as follows using C language code:

$$eq = ((v0 == v1)) \,|$$
$$((v1 == v2) \ll 1) \,|$$
$$((v2 == v3) \ll 2) \,|$$
$$((v3 == v4) \ll 3) \,|$$
$$((v4 == v5) \ll 4) \,|$$
$$((v5 == v6) \ll 5) \,|$$
$$((v6 == v7) \ll 6) \,|$$
$$((v7 == v8) \ll 7) \,|$$
$$((v8 == v9) \ll 8) \,;$$

Boundaries between adjacent equal pixels and an unequal pixel are then identified as illustrated in the following C language code (in the following code, down_loc refers to the relative location of two equal pixels followed by an unequal pixel (binary 110, therefore "down") and up_loc refers to the location of an unequal pixel followed by two equal pixels (binary 011, therefore "up"):

```
for (j=0;j<7;j++)
    if ((eq&(7<<j))==(6<<j))
    {
        down_loc = j;
        down_count++;
    }
for (j=0;j<7;j++)
    if ((eq&(7<<j))==(3<<j))
    {
```

-continued

```
        up_loc = j+2;
        up_count++;
    }
```

A particular deblocking filter is selected for pixels v1–v8 based on the up_count and down_count results. When either up_count exceeds 1 or down_count exceeds 1, then there are at least two sections of two consecutive equal pixels amongst the 10 pixels. Eq (the register value as related above) might be, for example, binary 011101111. Under such circumstances, most of the pixels are perceived to need deblocking filtering. Therefore the strongest deblocking filter will be applied to thereby effect a change to the value of all eight central pixels (v1 through v8) (again keeping in mind that the end pixels are typically not modified in a preferred approach).

When up_count equals to 1 and down_count equals to 1, there are two possible cases to consider in a preferred embodiment. In one case eq may be like binary 111101111. This would mean two sections of equal pixels amongst the ten pixels that are separated by a block edge. In the other case, eq may be binary 001111100. This would mean one section of equal pixels and two edges at the ends of equal pixels. Accordingly, the distance between up_loc and down_loc can be examined and an appropriate deblocking filter selected accordingly.

When the absolute value of up_loc-down_loc is less than 5, this tends to indicate the likely presence of localized blocking artifacts. Therefore a relatively strong deblocking filter will be applied that changes the value of six central pixels. Otherwise, when the absolute value of up_loc-down_loc is not less than 5, blocking artifacts are likely to affect all eight central pixels and hence a strongest deblocking filter that will change the value of all eight central pixels can be selected.

When down_count equals to 1 and up_count equals to 0, this tends to indicate that the left/top side has only two equal pixels (and therefore may be characterized as blocky). A corresponding left/top blocky deblocking filter can accordingly be applied at the location of down_loc (the respective center), therefore the value of down_loc is stored, preferably in memory, to be used by the later deblocking filter stage. When up_count equals to 1 and down_count equals to 0, this tends to indicate that the right/bottom side has only two equal pixels (and hence may also be characterized as blocky). A corresponding right/bottom blocky deblocking filter can accordingly be applied at the location of up_loc. The value of up_loc is also stored, preferably in memory, to be used by the later deblocking filter stage.

Otherwise, the process can conclude that there are no adjacent equal pixels and a weak filter (that will affect only two or four pixels, for example) can be applied at the center of the eight pixels.

In a preferred approach, there can be five deblocking filters that are available for selection when deblocking luminance information as otherwise suggested above. These candidate filters can include:

A strongest filter comprising, for example, a seven tap filter that will affect eight pixels.

A relatively strong filter comprising, for example, a seven tap filter that will affect six pixels.

A weak filter comprising, for example, either a five tap filter that will affect four pixels or a three tap filter that will affect two pixels (of course, both such examples of a weak filter can be provided and selected according to a more discriminatory process as desired).

A top/left blocky deblocking filter comprising, for example, a five tap filter that will affect five pixels.

A bottom/right blocky deblocking filter comprising, for example, a five tap filter that will affect five pixels.

Variations can of course be substituted and/or combined with these specific examples as desired and/or as appropriate to a given application. Additional information to characterize more specific examples of such deblocking filters will now be provided. (For purposes of the following description, $v_i$ will represent a pixel before filtering and $v_i'$ will represent the pixel after filtering, and QP will represent the respective Quantization Parameter.)

A seven tap deblocking filter to affect eight pixels (The Strongest Filter)

---

If (abs($v_2 - v_7$) < 4QP && abs($v_5 - v_9$) < 4QP && abs($v_0 - v_4$) < 4QP)
{
$$v_i' = \sum_{k=-3}^{3} v_{i+k}h_k, \quad 1 \leq i \leq 8$$

$\{h_k, -3 \leq k \leq 3\} = \{1,1,1,2,1,1,1\}//8$
}
else
   no change will be done.

---

A seven tap deblocking filter to affect six pixels (Relatively Strong)

---

If (abs($v_2 - v_7$) < 4QP && abs($v_5 - v_9$) < 4QP && abs($v_0 - v_4$) < 4QP)
{
$$v_i' = \sum_{k=-3}^{3} v_{i+k}h_k, \quad 2 \leq i \leq 7$$

$\{h_k, -3 \leq k \leq 3\} = \{1,1,1,2,1,1,1\}//8$
}
else
   no change will be done.

---

Either a five tap filter to affect four pixels or a three tap filter to affect two pixels (A Weak Filter)

---

If (abs($v_3 - v_4$) < qpb1[QP] && abs($v_4 - v_5$) < qpb2[QP] && abs($v_5 - v_6$) < qpb1[QP])
{
$$v_i' = \sum_{k=-2}^{2} v_{i+k}h_k, \quad 3 \leq i \leq 6$$

$\{h_k, -2 \leq k \leq 2\} = \{1,1,4,1,1\}//8$
}
else if (abs($v_3 - v_4$) < qpb2[QP] && abs($v_4 - v_5$) < qpb3[QP] && abs($v_5 - v_6$) < qpb2[QP])
{
$$v_i' = \sum_{k=-1}^{1} v_{i+k}h_k, \quad 4 \leq i \leq 5$$

$\{h_k, -1 \leq k \leq 1\} = \{1,2,1\}//4$

}
else
   no change will be done.

---

There are three look-up-tables that are preferably used here, as shown in Table 1.

TABLE 1

| QP | qpb1 | qpb2 | qpb3 |
|----|------|------|------|
| 1  | 1    | 2    | 3    |
| 2  | 2    | 4    | 6    |
| 3  | 3    | 6    | 9    |
| 4  | 4    | 8    | 11   |
| 5  | 5    | 9    | 14   |
| 6  | 6    | 10   | 16   |
| 7  | 7    | 11   | 19   |
| 8  | 8    | 12   | 22   |
| 9  | 9    | 13   | 25   |
| 10 | 10   | 14   | 28   |
| 11 | 10   | 16   | 30   |
| 12 | 11   | 18   | 33   |
| 13 | 11   | 19   | 35   |
| 14 | 12   | 20   | 37   |
| 15 | 12   | 22   | 39   |
| 16 | 13   | 23   | 40   |
| 17 | 14   | 24   | 42   |
| 18 | 14   | 26   | 44   |
| 19 | 15   | 27   | 45   |
| 20 | 15   | 29   | 47   |
| 21 | 16   | 30   | 48   |
| 22 | 16   | 31   | 50   |
| 23 | 17   | 32   | 52   |
| 24 | 17   | 33   | 53   |
| 25 | 18   | 33   | 55   |
| 26 | 18   | 34   | 57   |
| 27 | 19   | 35   | 58   |
| 28 | 19   | 36   | 59   |
| 29 | 19   | 37   | 60   |
| 30 | 20   | 37   | 60   |
| 31 | 20   | 38   | 61   |
| 32 | 20   | 38   | 61   |

A five tap deblocking filter that will affect five pixels (A Top/Left Blocky Filter)

The filtering will be centered around $v_{4+s}$ which is the respective center pixel identified earlier, and in a preferred implementation its location can be recalled from memory.

---

If ((abs($v_{4+s} - v_{6+s}$) < 2QP)and(s!=0)) or ((abs($v_{4+s} - v_{6+s}$) < 4QP)and (s == 0))
{
$$v_{2+s}' = \sum_{k=-1}^{3} v_{2+s+k}h_k,$$

$\{h_k, -1 \leq k \leq 3\} = \{1,4,1,1,1\}//8$ $$v_{3+s}' = \sum_{k=-1}^{3} v_{3+s+k}h_k,$$

$\{h_k, -1 \leq k \leq 3\} = \{1,4,1,1,1\}//8$ $$v_{4+s}' = \sum_{k=-1}^{2} v_{4+s+k}h_k,$$

$\{h_k, -1 \leq k \leq 2\} = \{1,4,2,1\}//8$

-continued $$v'_{5+s} = \sum_{k=-2}^{2} v_{5+s+k}h_k,$$

$$\{h_k, -2 \leq k \leq 2\} = \{1,1,4,1,1\}//8$$

$$v'_{6+s} = \sum_{k=-2}^{2} v_{6+s+k}h_k,$$

$$\{h_k, -2 \leq k \leq 2\} = \{1,1,4,1,1\}//8$$

}
else
    no change will be done.

A five tap deblocking filter that will affect five pixels (A Right/Bottom Block Filter)

The filtering will be centered around $v_{5+s}$ which is the respective center pixel identified earlier, and in a preferred implementation its location can be recalled from memory.

If $((abs(v_{3+s} - v_{5+s}) < 2QP)and(s!=0))$ or $((abs(v_{3+s} - v_{5+s}) < 4QP)and (s == 0))$
{

$$v'_{3+s} = \sum_{k=-2}^{2} v_{3+s+k}h_k,$$

$$\{h_k, -2 \leq k \leq 2\} = \{1,1,4,1,1\}//8$$

$$v'_{4+s} = \sum_{k=-2}^{2} v_{4+s+k}h_k,$$

$$\{h_k, -2 \leq k \leq 2\} = \{1,1,4,1,1\}//8$$

$$v'_{5+s} = \sum_{k=-2}^{1} v_{5+s+k}h_k,$$

$$\{h_k, -2 \leq k \leq 1\} = \{1,2,4,1\}//8$$

$$v'_{6+s} = \sum_{k=-3}^{1} v_{6+s+k}h_k,$$

$$\{h_k, -3 \leq k \leq 1\} = \{1,1,1,4,1\}//8$$

$$v'_{7+s} = \sum_{k=-3}^{1} v_{7+s+k}h_k,$$

$$\{h_k, -3 \leq k \leq 1\} = \{1,1,1,4,1\}//8$$

}
else
    no change will be done.

Such filters are well suited for use and application as described above.

Figure 8:
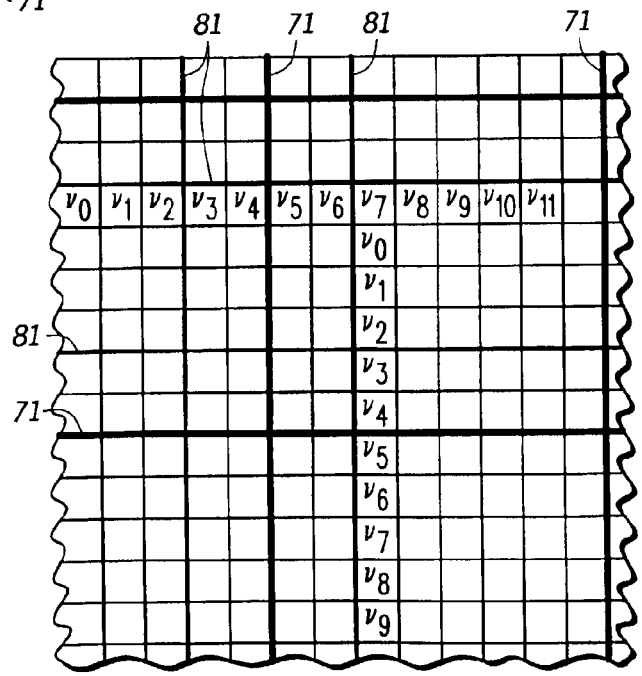
FIG. 8 comprises a graph as configured in accordance with an embodiment of the invention.

To some extent, filter selection for chrominance information follows a somewhat similar approach, but a significant difference also exists as the process itself has been greatly simplified. With reference to FIG. 8, all chrominance pixels are divided into 4 by 4 selection blocks (as defined in this illustration by, for example, the 4 by 4 boundary lines denoted by the reference numeral 81), with the original block boundaries 71 occurring in the middle of some of these 4 by 4 selection blocks. More particularly, both filter selection and filtering for chrominance information are based on such 4 by 4 blocks.

Otherwise, as with luminance information described above, horizontal and vertical deblocking filter decisions are determined in seriatim fashion. Of course, filter selection for chrominance is based instead upon an examination of four consecutive pixels (such as horizontally oriented pixels v3 through v6 or pixels v7 through v10, and so forth, where the boundary between pixels v4 and v5 comprises the original block boundary 71) in a row or a column.

To illustrate, suppose that pixels v3 through v6 are being considered:

eq = ((v3==v4)<<2) | ((v4==v5)<<1) | (v5==v6));
if ((eq>0) && (eq<7))
    //apply filtering for pixels v3–v6
else
    //no filtering.

This process will be applied to all such pixel groupings: v7 through v10, v11 through v14, and so forth.

For all such chrominance pixels, filtering will be applied in a simplified fashion. For a preferred embodiment, the filters can be as follows where • denotes inner product (and presuming for purposes of illustration that pixels v3 through v6 are being filtered):

$$v_3'=[v_3,v_4,v_5] \bullet [2,1,1]//4$$

$$v_4'=[v_3,v_4,v_5] \bullet [1,2,1]//4$$

$$v_5'=[v_4,v_5,v_6] \bullet [1,2,1]//4$$

$$v_6'=[v_4,v_5,v_6] \bullet [1,1,2]//4.$$

Figure 9:
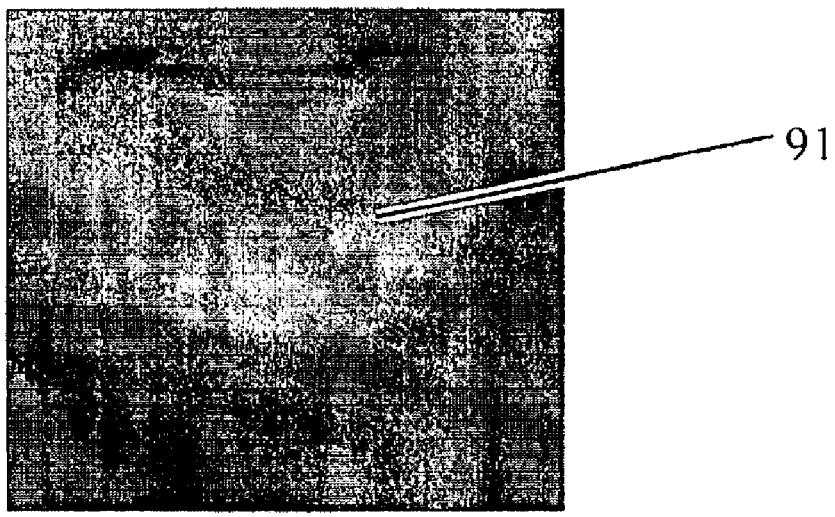
FIG. 9 comprises a prior art deblocking result.
Figure 10:
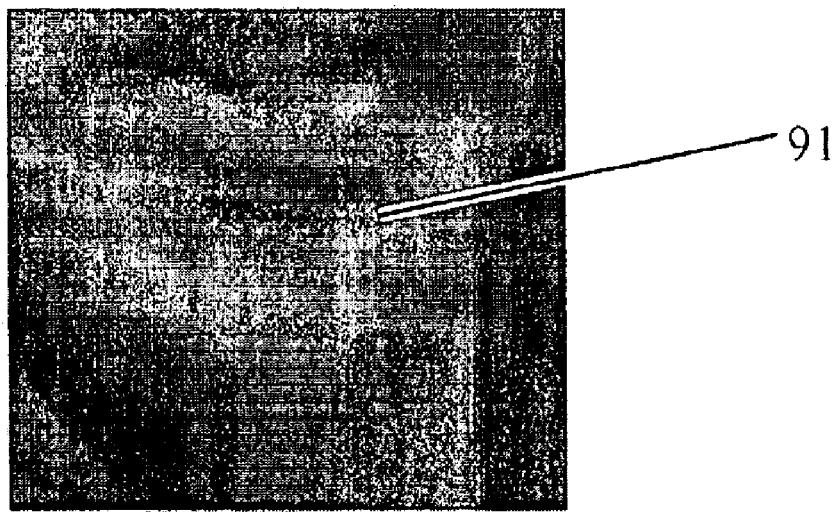
FIG. 10 comprises a deblocking result as exemplary of an embodiment of the invention.

These various techniques can be utilized, in most or all cases, with virtually no concomitant increase in required hardware. Instead, these functions can be effected through the same computational platform that would ordinarily be used to effect other prior art deblocking methodologies. In fact, in most or all cases, these techniques can achieve a superior deblocked result with less computation complexity and overhead than these same prior art approaches. For example, FIG. 9 comprises a single frame depicting an individual 91 that has been deblocked in accordance with one prior art approach. FIG. 10 comprises that same frame of information where the source information has been deblocked in accordance with these teachings. The video has clearly benefited from a considerable reduction in blocking artifacts as compared to the prior art approach.

These improved results are derived through a less computational complex approach based, in part, upon differential treatment of luminance and chrominance information, the selection of a particular deblocking filter as based upon pixels that share a common attribute, and the application of the applied filter with respect to a respective center of those pixels that share a common attribute, as well as other features and approaches set forth herein.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method comprising:
    providing a plurality of decoded video information comprising a plurality of pixels;

comparing pixels from amongst the plurality of pixels having a predetermined spatial relationship to one another to identify at least one group of pixels that share a common attribute;

selecting a deblocking filter based, at least in part, upon the at least one group of pixels that share a common attribute;

applying the deblocking filter as a function of a respective center of at least one group of pixels within the at least one group of pixels.

2. The method of claim 1 wherein comparing pixels from amongst the plurality of pixels having a predetermined spatial relationship to one another includes comparing pixels from amongst the plurality of pixels that are adjacent to one another.

3. The method of claim 2 wherein comparing pixels from amongst the plurality of pixels that are adjacent to one another includes at least one of:

comparing pixels from amongst the plurality of pixels that are horizontally adjacent to one another; and comparing pixels from amongst the plurality of pixels that are vertically adjacent to one another.

4. The method of claim 1 wherein comparing pixels from amongst the plurality of pixels having a predetermined spatial relationship to one another to identify at least one group of pixels that share a common attribute includes comparing pixels from amongst the plurality of pixels having a predetermined spatial relationship to one another to identify pairs of pixels that are substantially similar to one another.

5. The method of claim 1 wherein comparing pixels from amongst the plurality of pixels having a predetermined spatial relationship to one another to identify at least one group of pixels that share a common attribute includes locating the respective center of at least one group of pixels within the at least one group of pixels to apply deblocklng filters based, at least in part on the common attribute.

6. The method of claim 1 wherein selecting a deblocking filter includes selecting a deblocking filter from amongst a plurality of deblocking filters.

7. The method of claim 6 wherein selecting a deblocking filter from amongst a plurality of deblocking filters includes selecting a deblocking filter from amongst a plurality of deblocking filters that include at least:

a strong filter that will affect a majority of the pixels as are contained within a specific grouping of the pixels; and a weak filter that will affect only a minority of the pixels as are contained within the specific grouping of the pixels.

8. The method of claim 1 wherein applying the deblocking filter as a function of the respective center includes applying the deblocking filter bilaterally symmetrical with respect to the respective center.

9. The method of claim 1 wherein applying the deblocking filter as a function of the respective center includes applying the deblocking filter bilaterally non-symmetrical with respect to the respective center.

10. A method for deblocking decoded video information that includes luminance information and chrominance information, comprising:

deblocking the luminance information pursuant to a first deblocking process; and deblocking the chrominance information using a deblocking process other than the first deblocking process;

wherein deblocking the luminance information pursuant to the first deblocking process includes:

comparing pixels from amongst a block of pixels having a predetermined spatial relationship to one another to identify at least one group of pixels that share a common attribute;

selecting a deblocking filter based, at least in part, upon the at least one group of pixels that share a common attribute;

applying the deblocking filter as a function of a respective center of at least one group of pixels within the at least one group of pixels.

11. The method of claim 10 wherein comparing pixels from amongst the block of pixels having a predetermined spatial relationship to one another includes comparing pixels from amongst the block of pixels that are adjacent to one another.

12. The method of claim 11 wherein comparing pixels from amongst the block of pixels that are adjacent to one another includes at least one of:

comparing pixels from amongst the block of pixels that are horizontally adjacent to one another; and comparing pixels from amongst the block of pixels that are vertically adjacent to one another.

13. The method of claim 11 wherein comparing pixels from amongst the block of pixels that are adjacent to one another to identify at least one group of pixels that share a common attribute includes comparing pixels from amongst the block of pixels that are adjacent to one another to identify pairs of pixels that are substantially similar to one another.

14. The method of claim 10 wherein comparing pixels from amongst a block of pixels having a predetermined spatial relationship to one another to identify at least one group of pixels that share a common attribute includes locating the respective center of at least one group of pixels to apply deblocking filters based, at least in part, on the common attribute.

15. The method of claim 13 wherein selecting a filter includes selecting a deblocking filter from amongst a plurality of deblocking filters.

16. The method of claim 15 wherein selecting a deblocking filter from amongst a plurality of deblocking filters includes selecting a deblocking filter from amongst a plurality of deblocking filters that include at least:

a strong filter that will affect a majority of the pixels as are contained within a specific grouping of the pixels; and a weak filter that will affect only a minority of the pixels as are contained within the specific grouping of the pixels.

17. The method of claim 10 wherein applying the deblocking filter as a function of the respective center includes applying the deblocking filter bilaterally symmetrical with respect to the respective center.

18. The method of claim 10 wherein applying the deblocking filter as a function of the respective center includes applying the deblocking filter bilaterally non-symmetrical with respect to the respective center.

19. An apparatus comprising:

a decoded video data input;

an adjacent similar pixel detector having an input operably coupled to the decoded video data input and having an adjacent similar pixel count output and a similar pixel section count output;

a deblocking filter selector that is responsive to the adjacent similar pixel count output and the similar pixel section count output and having a deblocking filter selection output; and a plurality of deblocking filters responsive to the deblocking filter selection output.

20. The apparatus of claim 19 and further comprising a video decoder having a decoded video data output that is operably coupled to the decoded video data input.

21. The apparatus of claim 19 and further comprising a display that is operably coupled to at least one of the plurality of deblocking filters.

22. The apparatus of claim 19 wherein the plurality of deblocking filters includes at least one strong filter that will affect a majority of pixels as are contained within a specific grouping of pixels and at least one weak filter that will affect only a minority of the pixels as are contained within the specific grouping of the pixels.

23. The apparatus of claim 19 wherein the plurality of deblocking filters includes at least four deblocking filters.

24. The apparatus of claim 19 wherein the plurality of deblocking filters includes at least one bilaterally symmetrical filter and at least one bilaterally non-symmetrical filter.

* * * * *